United States Patent [19]

Joy

[11] 3,865,797
[45] Feb. 11, 1975

[54] PROCESS FOR THE PRODUCTION OF PETROLEUM RESINS OF VARYING SOFTENING POINTS

[75] Inventor: David Richard Joy, Stockton-on-Tees, England

[73] Assignee: Imperial Chemical Industries Limited, London, England

[22] Filed: Sept. 24, 1973

[21] Appl. No.: 400,301

[30] Foreign Application Priority Data
Oct. 2, 1972  Great Britain ..................... 45333/72

[52] U.S. Cl. ................................................. 260/82
[51] Int. Cl. ........................................... C08f 15/42
[58] Field of Search ...................................... 260/82

[56] References Cited
UNITED STATES PATENTS 3,661,870  5/1972  Bullard ................................. 260/82
3,709,854  1/1973  Hepworth et al. ..................... 260/82

Primary Examiner—Harry Wong, Jr.
Attorney, Agent, or Firm—Cushman, Darby & Cushman

[57] ABSTRACT

A petroleum resin feedstock comprises a $C_5$ stream distilled from a cracked petroleum fraction to which has been added butadiene raffinate which comprises isobutene, butenes-1 and -2 and butanes and which is what remains of a $C_4$ fraction after removal of butadiene. The feedstock may be polymerised to a petroleum resin by means of a Friedel Crafts catalyst.

8 Claims, No Drawings

PROCESS FOR THE PRODUCTION OF PETROLEUM RESINS OF VARYING SOFTENING POINTS

The present invention relates to the production of petroleum resins.

British Patent Specification No. 812,388 includes a description of a process for producing a copolymer of molecular weight 2,500 to 40,000 in which a steam cracked petroleum hydrocarbon product having a boiling range within the range of −55°C to 190°C is copolymerised with an unsymmetrical polysubstituted ethylene containing the carbon skeleton.

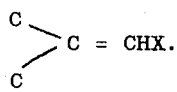

Isobutene is a preferred polysubstituted ethylene and a preferred copolymer is derived from a polymerisation feed essentially comprising 2 to 10 and preferably 4 to 6 parts by weight of the cracked petroleum hydrocarbon product and 1 to 4, preferably 1 to 3 parts by weight of the unsymmetrical polysubstituted ethylene.

The polymers produced by polymerising steam cracked petroleum hydrocarbon products such as are described in specification Ser. No. 812,388 are resinous in nature and have softening points in the range 70° to 120°C. The temperature at which the resin melts is dependent on the composition of the feed from which it is made and it is a commercially important property because it affects the uses to which the resin may be applied. We have found that the softening points of a resin derived from a given feedstock may be varied in a controlled manner by adding varying amounts of "butadiene raffinate."

According to the invention a feedstock for petroleum resin manufacture comprises a $C_5$ stream distilled from a cracked petroleum fraction to which has been added butadiene raffinate.

"Butadiene raffinate" is what remains after the butadiene has been removed from a $C_4$ hydrocarbon fraction which is in turn obtained by distillation from a cracked hydrocarbon product. It consists of isobutene, butene-1, cis- and trans-butene-2, butanes and possibly a trace of butadiene. It is considerably cheaper than isobutene and we have found that as the butene-1 and butene-2 also contribute to modifying the properties of the resin product the butadiene raffinate possesses unexpected advantages over isobutene alone. The amount of butadiene raffinate added to the $C_5$ feedstock depends on the softening point of the resin required but generally is up to 30 wt. percent, preferably up to 20 wt. percent. The precise amount of raffinate required to depress the softening point of a resin derived from a given $C_5$ feedstock will depend on the nature of that feedstock but may readily be determined by simple experiment.

The $C_5$ stream like the $C_4$ fraction is preferably derived from a thermally or steam cracked naptha or gas oil and typically boils in the range 10° to 80°C. It generally contains most of the following hydrocarbons:- isoprene, cis- and trans-piperylene, n-pentane, isopentane, pentene-1, cyclopentadiene, dicyclopentadiene, trans-pentene-2, 2-methylbutene-1,3-methylbutene-1, 2-methylbutene-2, cyclopentene, cyclopentane and benzene. If desired this $C_5$ stream may be further refined before being used in the process of the present invention, e.g., the isoprene may be removed by distillation.

The $C_5$ stream, before or after the addition of the butadiene raffinate, may be heated to a temperature of at least 100°C, preferably to a temperature in the range 100° to 150°C, so as to dimerise any monocyclopentadiene which may be present. The presence of the monomer tends to produce unusable gelatinous resins.

The feedstock prepared in accordance with the present invention may be polymerised by means of a catalyst to produce a resin. Friedel Crafts catalysts are suitable, e.g., inorganic halides and inorganic strong acids. Inorganic halides are generally preferred and include halides of aluminum, iron, tin, boron, zinc, antimony and titanium which may be used in conjunction with a hydrogen halide such as hydrogen chloride. For example, treatment with aluminum chloride, preferably complexed with hydrogen chloride in an aromatic solvent such as toluene or a xylene, produces a solution from which the resin may be recovered. Preferably, however, the Friedel Crafts catalyst is used in an aromatic solvent which is a benzene which is liquid at the temperature of the polymerisation and which is substituted by at least one secondary or tertiary alkyl group or by a cycloalkyl group, e.g., tert.butyl benzene, p-cymene, p-isobutyl toluene, p-ethyl-tert.amyl benzene, or in particular, cumene. Such catalysts are described in our Belgian Pat. No. 779,454. a complex of aluminum chloride, cumene and hydrogen chloride being preferred. The polymerisation of the $C_5$ feedstock is preferably carried out at a temperature of −100°C to +150°C under atmospheric pressure and the catalyst is finally broken down and removed from the polymer by treatment, for example with alcoholic ammonia or aqueous alkali or by extraction with an isopropanol/water mixture followed by one or more washes with water and, optionally, a steam distillation, to remove residual monomers. By this means polymers having molecular weights in the range 500 to 40,000 are obtained.

The invention will now be further described with reference to the following Example:

EXAMPLE

The $C_5$ stream used was derived from a steam cracked naphtha and contained isoprene, cis and transpiperylene, n-pentane, isopentane, pentene-1, cyclopentadiene, dicyclopentadiene, trans-pentene-2, 2-methylbutene-1, 3-methylbutene-1, 2-methylbutene-2, cyclopentene, cyclopentane and benzene. To this was added 12 wt. percent butadiene raffinate of composition butene-2 (23 wt. percent), isobutene (45 wt. percent), trans-butene-2, (8 wt. percent), cis-butene-2 (7 wt. percent), butadiene (1.0 wt. percent) the balance being butanes. The stream was then heated in a tubular reactor in which its residence time was 30 minutes, the temperature in the reactor varying over its length from 120° to 140°C. On leaving the reactor the stream was passes through a second, unheated reactor in which its residence time was 40 minutes.

The polymerisation was carried out at ambient temperature by treating the feedstock with a catalyst complex produced by dissolving aluminum chloride in cumene while bubbling hydrogen chloride through the liquid. Sufficient complex was added to provide 0.8 percent by weight of aluminum chloride based on the weight of hydrocarbon feedstock. Catalyst addition took place over a ½ hour period following which the catalyst was decomposed by the addition of ammoniacal aqueous isopropanol, the aluminum chloride being removed in the aqueous solution. The resin was finally water washed, dried, distilled to remove volatile impurities and vacuum distilled to remove heavy oils.

The resin produced by this process had a softening point of 97.5°C as compared with a resin produced from the $C_5$ stream without the butadiene raffinate which had a softening point of 120°C.

I claim:

1. A process for the production of petroleum resins of varying softening points in which the residue remaining after the removal of butadiene from a $C_4$ fraction and which consists of iso-butene, butene-1, cis- and trans-butene-2 and butanes is added to a $C_5$ stream boiling in the range 10° to 80° C which is derived from a thermally or steam cracked naphtha or gas oil and the resulting mixture polymerized by means of a Friedel Crafts catalyst, the amount of said residue added being chosen to achieve lowering the softening point in the resin.

2. The process of claim 1 in which the amount of residue which has been added is up to 30 percent by weight.

3. The process of claim 1 wherein the mixture has been heated to a temperature of at least 100° C so as to dimerise any mono- cyclopentadiene which may be present.

4. The process of claim 2 wherein the $C_5$ stream contains cis- and trans- piperylene, n-pentane, isopentane, pentene-1, dicylopentadiene, trans-pentene-2, 2-methyl-butene-1, 3-methylbutene-1, 2-methylbutene-2, cyclopentene and cyclopentane.

5. The process of claim 1 in which the Friedel Crafts catalyst is a halide of an element selected from the group consisting of aluminium, iron, tin, boron, zinc, antimony and titanium.

6. The process of claim 5 in which the catalyst is aluminium chloride complexed with hydrogen chloride in an aromatic solvent.

7. The process of claim 6 in which the aromatic solvent is toluene, xylene or a benzene which is liquid at the temperature of the polymerisation and which is substituted by at least one secondary or tertiary alkyl group or by a cycloalkyl group.

8. A process for the production of a petroleum resin in which the feedstock of claim 4 is contacted with a catalyst comprising aluminium chloride and hydrogen chloride in toluene, xylene, cumene, tert-butylbenzene, p-cymene, p-isobutyl toluene or p-ethyl-tert.amylbenzene at a temperature in the range $-100°$ C to $+150°$ C.

* * * * *